(12) United States Patent
Chen

(10) Patent No.: US 11,820,261 B2
(45) Date of Patent: Nov. 21, 2023

(54) ACCESSORY AND INFANT SEAT HAVING ACCESSORY

(71) Applicant: Bambino Prezioso Switzerland AG, Steinhausen (CH)

(72) Inventor: Hongbo Chen, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 31 days.

(21) Appl. No.: 17/367,593

(22) Filed: Jul. 5, 2021

(65) Prior Publication Data

US 2022/0001775 A1 Jan. 6, 2022

(30) Foreign Application Priority Data

Jul. 6, 2020 (CN) .......................... 202010641199.1

(51) Int. Cl.
*B60N 2/28* (2006.01)

(52) U.S. Cl.
CPC ............. *B60N 2/2839* (2013.01); *B60N 2/28* (2013.01); *B60N 2/2887* (2013.01)

(58) Field of Classification Search
CPC ............................ B60N 2/2839; B60N 2/2887
See application file for complete search history.

(56) References Cited

U.S. PATENT DOCUMENTS

| 4,436,341 A | * | 3/1984 | Converse | B60N 2/2839 |
| | | | | 297/484 |
| 4,634,185 A | * | 1/1987 | Kassai | B60N 2/2839 |
| | | | | 297/148 |
| 4,671,574 A | * | 6/1987 | Kassai | B60N 2/2839 |
| | | | | 297/487 |
| 5,094,506 A | * | 3/1992 | Costa | B60N 2/2839 |
| | | | | 297/184.12 |

(Continued)

FOREIGN PATENT DOCUMENTS

| CN | 101670796 B | 11/2011 |
| CN | 204687884 U | 10/2015 |

(Continued)

OTHER PUBLICATIONS

MO, CN-105015376-B, Aug. 8, 2017, English translation (Year: 2017).*

*Primary Examiner* — David R Dunn
*Assistant Examiner* — Tania Abraham
(74) *Attorney, Agent, or Firm* — Winston Hsu

(57) ABSTRACT

The present invention discloses an accessory and an infant seat having the accessory. The accessory includes a main body, an engaging portion and an operating member. The engaging portion is disposed on the main body and has a locking position for engaging with the infant seat and a releasing position for disengaging from the infant seat. The operating member is slidably disposed on the main body and is connected to the engaging portion. The operating member is operated to slide for switching the engaging portion (Continued)

between the locking position and the releasing position. The accessory moves the engaging portion to the locking or releasing position via sliding of the operating member, so that the accessory can be engaged with or detached from the infant seat. The accessory is convenient to operate and has a simple structure and a low manufacturing cost.

16 Claims, 7 Drawing Sheets

(56) References Cited

U.S. PATENT DOCUMENTS

| | | | |
|---|---|---|---|
| 7,887,140 B1* | 2/2011 | Forlivio | B60N 2/286 297/238 |
| 8,291,555 B2* | 10/2012 | Buckingham | B60N 2/2806 24/599.3 |
| 8,646,158 B2* | 2/2014 | Buckingham | B60N 2/2887 24/599.3 |
| 2010/0060056 A1* | 3/2010 | Pos | B60N 2/2851 297/256.15 |
| 2014/0015300 A1* | 1/2014 | Yi | A47D 15/006 297/464 |
| 2015/0115677 A1* | 4/2015 | Pos | B23Q 1/0054 297/468 |

FOREIGN PATENT DOCUMENTS

| | | |
|---|---|---|
| CN | 105015376 A | 11/2015 |
| CN | 102848945 B | 3/2016 |
| CN | 105015376 B | 8/2017 |
| EP | 2 623 368 B1 | 10/2015 |
| TW | 201307110 A1 | 2/2013 |
| TW | I624386 B | 5/2018 |

\* cited by examiner

ACCESSORY AND INFANT SEAT HAVING ACCESSORY

BACKGROUND OF THE INVENTION

1. Field of the Invention

The present invention relates to an accessory and an infant seat thereof, and more specifically, to an accessory having an operating member for performing locking and releasing operations and an infant seat thereof.

2. Description of the Prior Art

An infant seat is designed for ensuring safety of an infant in a car. The infant seat is assembled in the car to allow the infant sitting thereon for constraining the infant in the car, so as to ensure safety of the infant while the car is moving. There are two kinds of safety accessories on the infant seat in the market: one is a five-point safety belt, and the other one is a front protection body. The infant seat having the front protection body mounted thereon can efficiently protect the cervical spine of the infant. After the infant is sitting on the infant seat, the front protection body is fixedly connected to the infant seat. Because the front protection body does not completely fix the infant on the infant seat, the infant can bend his body during sudden collision or emergency brake and the front protection body can provide a buffer to the infant, so as to reduce the impact to the cervical spine of the infant. The front protection body is usually detachable from the infant seat. In general, by operating an operating member on the front protection body, the front protection body can be directly detached from the infant seat. However, since the front protection body is easily detached from the infant seat due to wrong operation of the operating member on the front protection body performed by a user, it may cause a great risk to safety of an infant in a car.

SUMMARY OF THE INVENTION

A first purpose of the present invention is to provide an accessory that is convenient to operate and has a low manufacturing cost.

A second purpose of the present invention is to provide an infant seat having the aforesaid accessory mounted thereon for improving the operational convenience of the infant seat and reducing the manufacturing cost of the infant seat.

The first purpose is achieved by an accessory of the present invention. The accessory includes a main body, an engaging portion, and an operating member. The engaging portion is disposed on the main body. The engaging portion has a locking position for engaging with an infant seat and a releasing position for disengaging from the infant seat. The operating member is slidably disposed on the main body and connected to the engaging portion. The operating member is operated to slide for switching the engaging portion between the locking position and the releasing position.

Compared with the prior art, the accessory of the present invention adopts the design in which the operating member can be operated to slide for switching the engaging portion to the locking position or the releasing position such that the accessory can be engaged with or disengaged from the infant seat. The accessory is convenient to operate and has a simple structure and a low manufacturing cost.

Preferably, the engaging portion includes an engaging hook pivoted to the main body. The engaging hook is connected to the operating member, and the engaging hook rotates between the locking position and the releasing position via sliding of the operating member.

Preferably, the operating member has a connection pin fixed thereon, and a guide slot is formed on the engaging hook. The connection pin is movably disposed in the guide slot, and the operating member rotates the engaging hook via the connection pin.

Preferably, the operating member further has an insertion member fixed thereon, and an insertion slot is formed on the engaging hook. The insertion member is inserted into or disengaged from the insertion slot via sliding of the operating member.

Preferably, the engaging portion further includes a first elastic member for returning the engaging hook to its original position, and the first elastic member is disposed between the engaging hook and the main body.

Preferably, the first elastic member drives the engaging hook to rotate to the releasing position.

Preferably, the accessory further includes a second elastic member for returning the operating member to its original position, and the second elastic member is disposed between the operating member and the main body.

Preferably, an elastic force of the first elastic member exerted upon the engaging hook is larger than an elastic force of the second elastic member exerted upon the engaging hook via the operating member.

Preferably, the accessory further includes an insertion pin and a blocking member. The insertion pin is slidably disposed on the operating member, the blocking member is fixed to the main body in a sliding direction of the operating member for blocking the insertion pin, and the operating member is slidable when the insertion pin is disengaged from the blocking member.

Preferably, a sliding slot is formed on the operating member, and the insertion pin is slidably disposed in the sliding slot.

Preferably, the accessory further includes a third elastic member for returning the insertion pin to its original position, and the third elastic member is disposed between the insertion pin and the operating member.

Preferably, the accessory further includes a secondary security lock slidably disposed on the main body, and the secondary security lock slides for pushing the insertion pin to be disengaged from the blocking member.

Preferably, a ramped surface is formed on an end of the secondary security lock, and the secondary security lock drives the insertion pin to slide via the ramped surface.

Preferably, the accessory further includes a fourth elastic member for returning the secondary security lock to its original position, and the fourth elastic member is disposed between the secondary security lock and the main body.

Preferably, the main body includes a buffer portion and a connection frame. The buffer portion is connected to the connection frame, and the engaging portion and the operating member are disposed on the connection frame.

Preferably, the connection frame is slidably disposed at a side of the buffer portion.

The second purpose is achieved by an infant seat of the present invention. The infant seat includes a seat body and the aforesaid accessory. The engaging portion is detachably engaged with the seat body.

Compared with the prior art, the infant seat of the present invention has the accessory mounted thereon. The accessory adopts the design in which the operating member can be operated to slide for switching the engaging portion to the locking position or the releasing position such that the accessory can be engaged with or disengaged from the infant seat. The accessory is convenient to operate and has a simple structure and a low manufacturing cost.

Preferably, the seat body has a transverse rod for engaging with the engaging portion.

These and other objectives of the present invention will no doubt become obvious to those of ordinary skill in the art after reading the following detailed description of the preferred embodiment that is illustrated in the various figures and drawings.

DETAILED DESCRIPTION

The detailed description for preferred embodiments of the present invention is provided with attached drawings as follows.

Figure 1:
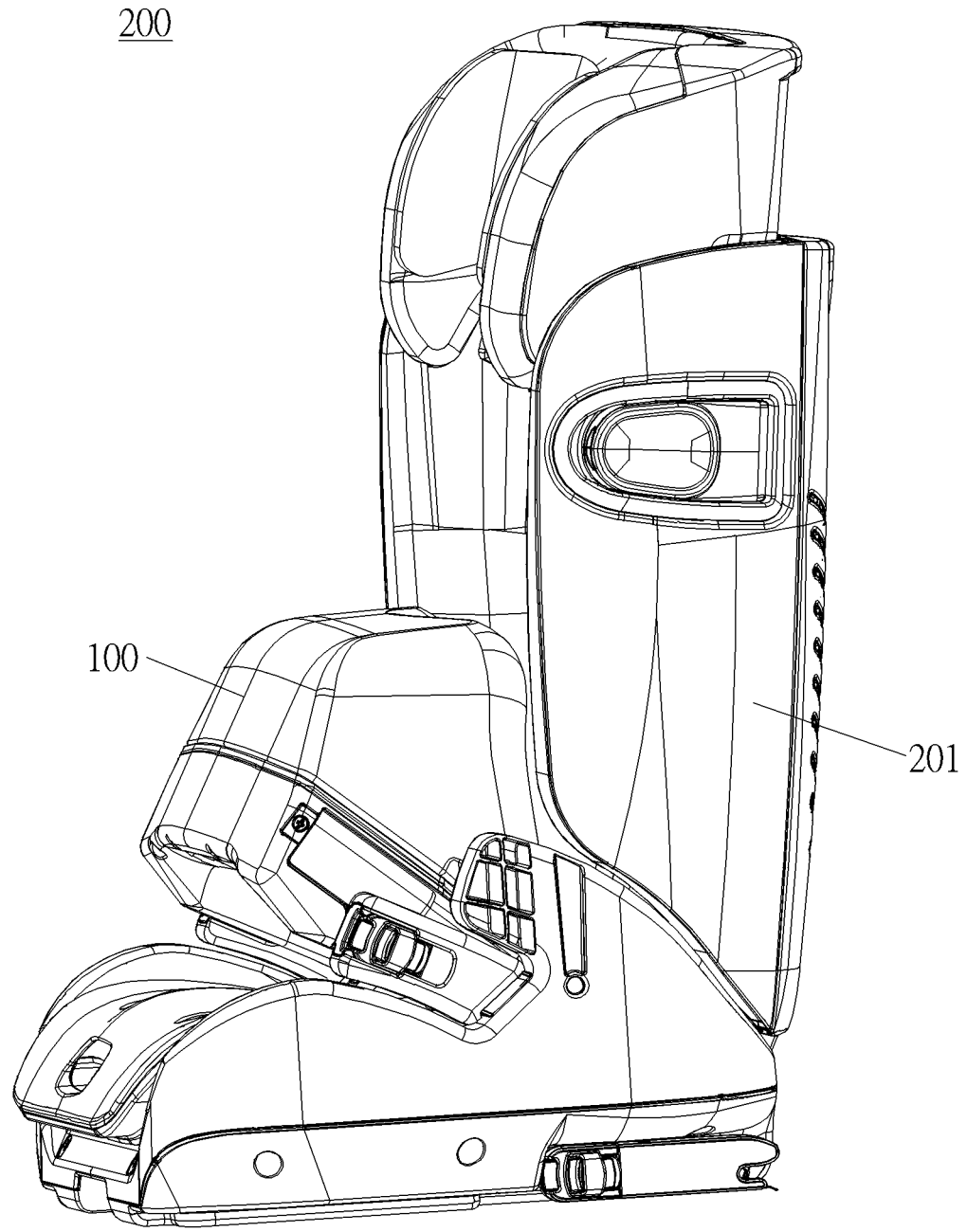
FIG. 1 is a diagram of an infant seat of the present invention.
Figure 2:
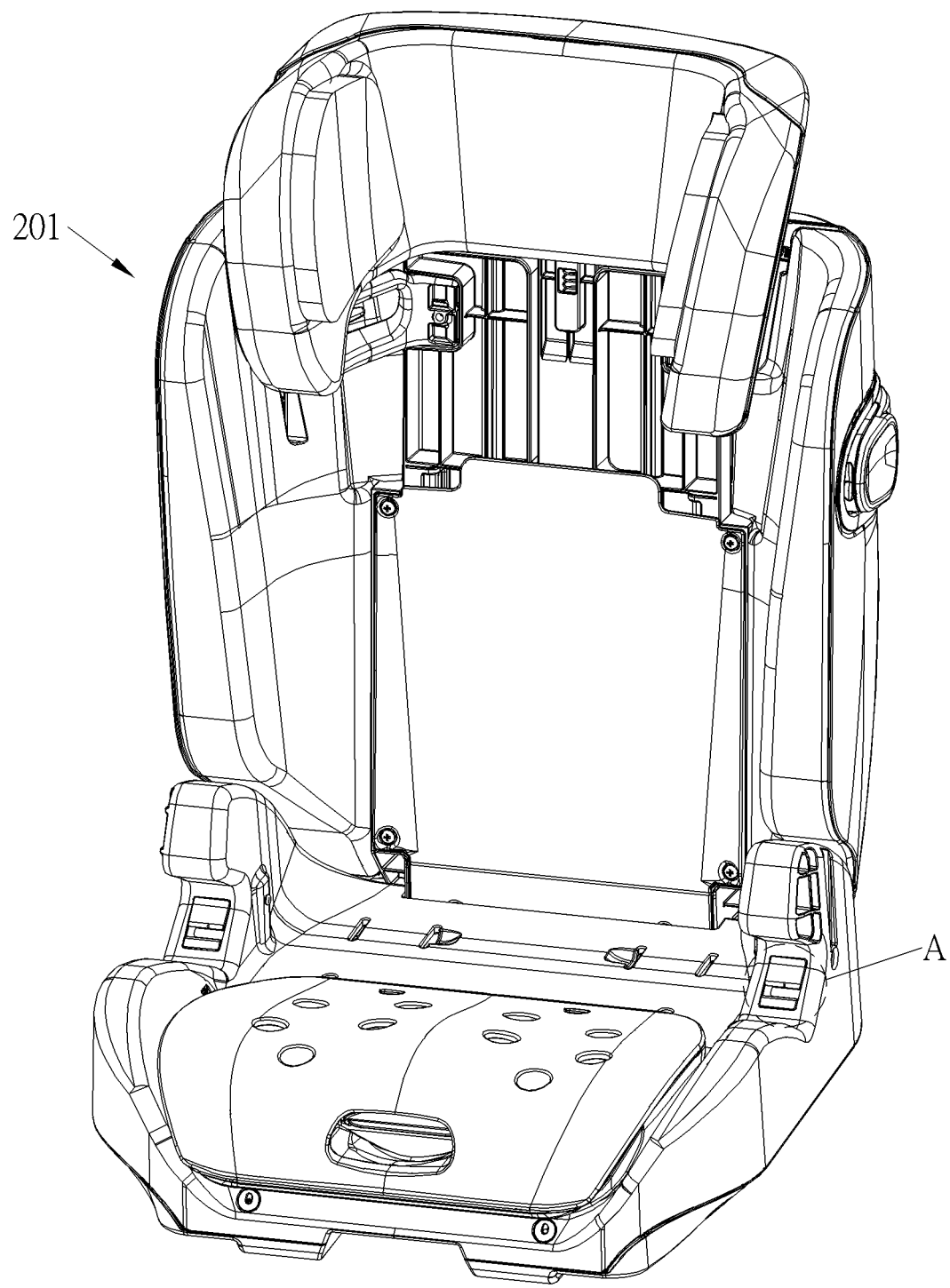
FIG. 2 is a diagram of a seat body of the infant seat of the present invention.
Figure 3:
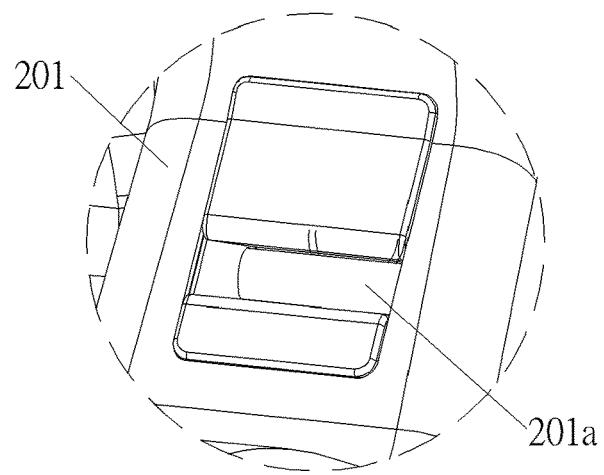
FIG. 3 is an enlarged diagram of the seat body at a region "A" in FIG. 2.

Please refer to FIG. 1. An infant seat 200 of the present invention includes a seat body 201 and an accessory 100. As shown in FIGS. 4-8, the accessory 100 includes a main body 1, an engaging portion 2, and an operating member 3. The engaging portion 2 is disposed on the main body 1 and can be engaged with the seat body 201. The engaging portion 2 has a locking position for engaging with the infant seat 200 and a releasing position for disengaging from the infant seat 200. The operating member 3 is slidably disposed on the main body 1 and is connected to the engaging portion 2. The operating member 3 can be operated to slide for switching the engaging portion 2 between the locking position and the releasing position. When the accessory 100 needs to be engaged with the seat body 201, the operating member 3 can be operated to slide for moving the engaging portion 2 to the locking position to be engaged with the seat body 201. When the accessory 100 needs to be disengaged from the seat body 201, the operating member 3 can be operated to slide for moving the engaging portion 2 to the releasing position to be disengaged from the seat body 201, so that the accessory 100 can be detached from the seat body 201. The accessory 100 is convenient to operate and has a simple structure and a low manufacturing cost. As shown in FIG. 2 and FIG. 3, in this embodiment, the seat body 201 has a transverse rod 201a disposed thereon, and the engaging portion 2 can be engaged with the transverse rod 201a to fix the accessory 100 on the seat body 201.

Figure 7:
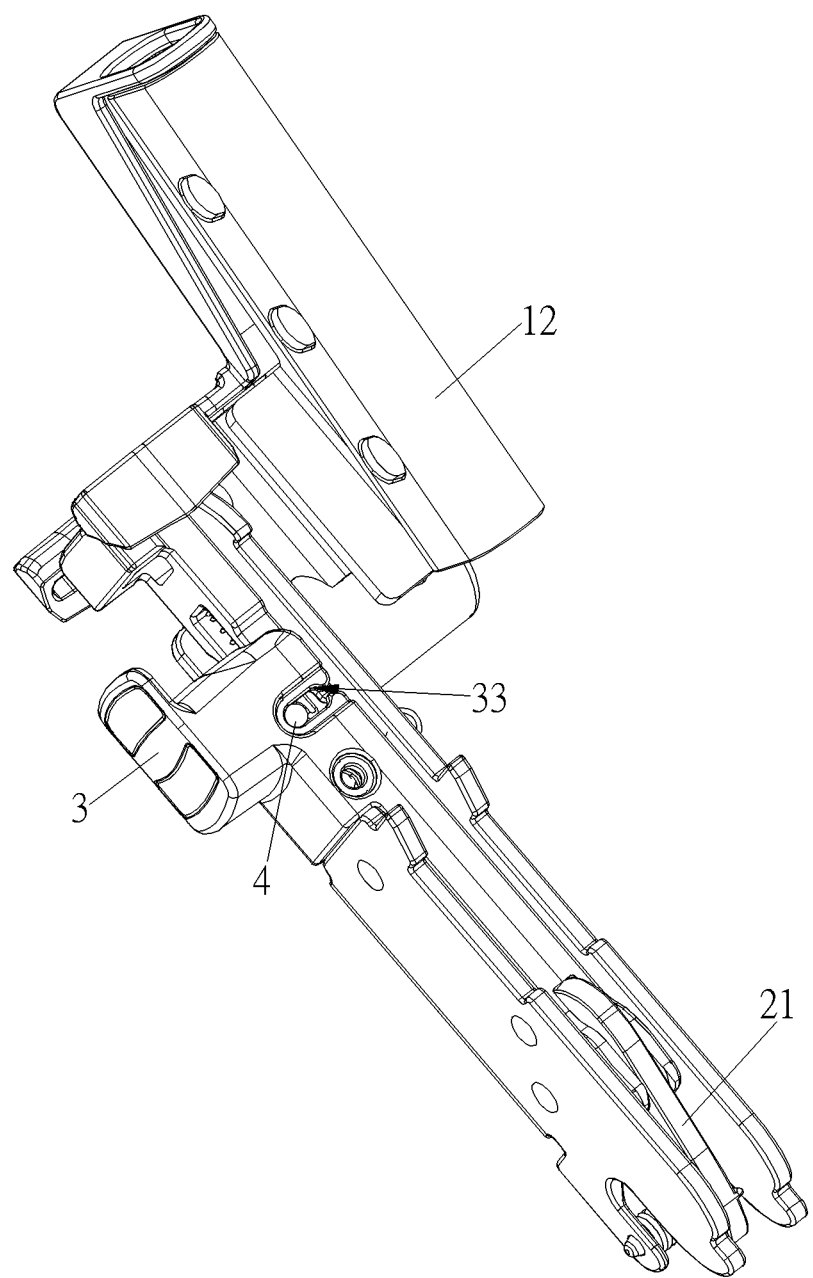
FIG. 7 is a diagram of the connection frame in FIG. 6 at another viewing angle.
Figure 8:
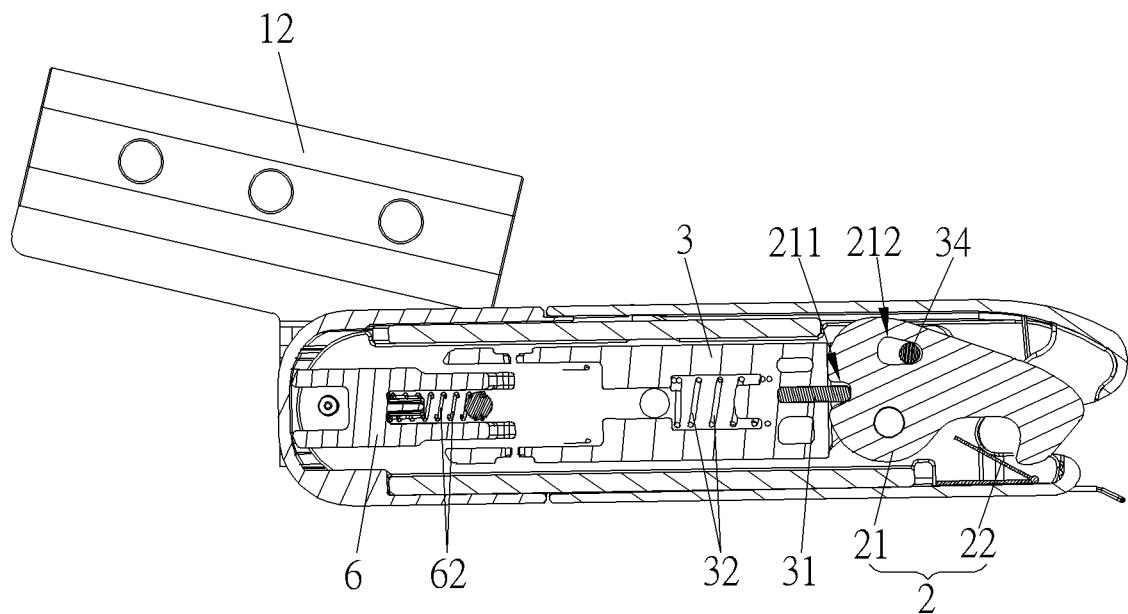
FIG. 8 is a cross-sectional diagram of the connection frame in FIG. 6 along a cross-sectional line B-B.
Figure 9:
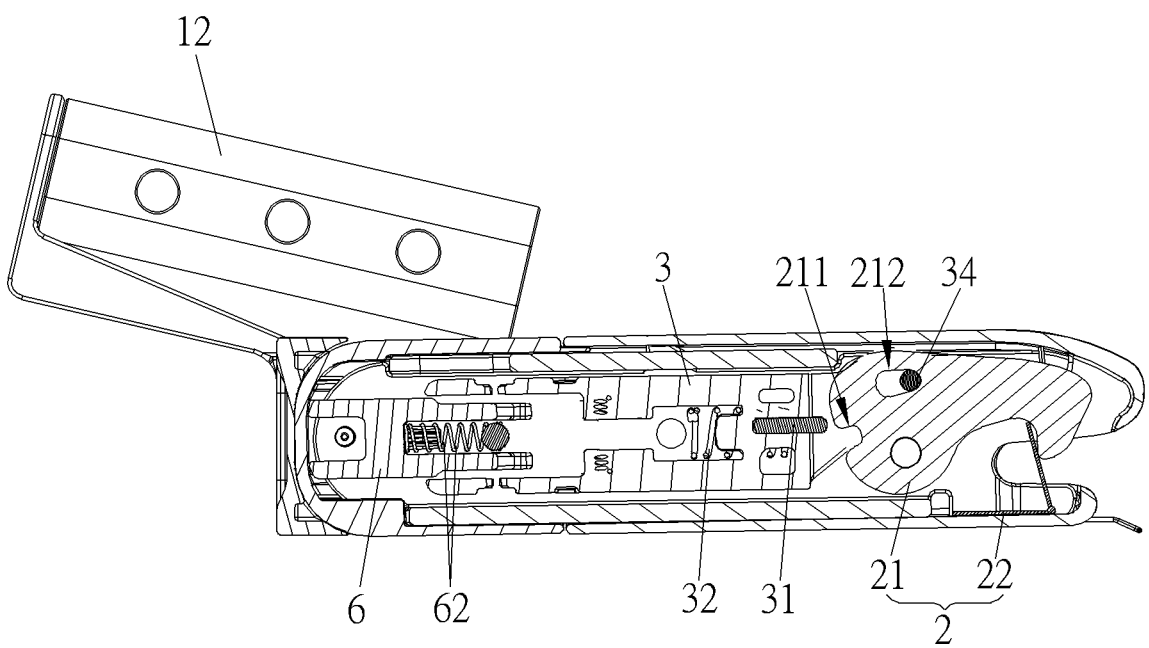
FIG. 9 is a cross-sectional diagram of the connection frame in FIG. 8 after an insertion member is disengaged from an insertion slot.

Please refer to FIGS. 7-9. The engaging portion 2 could include an engaging hook 21 pivoted to the main body 1 and connected to the operating member 3. Via sliding of the operating member 3, the engaging hook 21 can be rotatably switched between the locking position and the releasing position. Specifically, a connection pin 34 is fixed on the operating member 3, and a guide slot 212 is formed on the engaging hook 21. The connection pin 34 is movably disposed in the guide slot 212. The operating member 3 can rotate the engaging hook 21 via the connection pin 34. That is, the operating member 3 can be operated to slide for moving the connection pin 34, such that the connection pin 34 can push the engaging hook 21 to rotate. Moreover, the engaging portion 2 could further include a first elastic member 22 for returning the engaging hook 21 to its original position. The first elastic member 22 is disposed between the engaging hook 21 and the main body 1. Specifically, the first elastic member 22 is used to rotate the engaging hook 21 toward the releasing position, but not limited thereto. For example, in another embodiment, the first elastic member 22 could be used to rotate the engaging hook 21 toward the locking position. In this embodiment, the first elastic member 22 could be a torsional spring, but not limited thereto.

Please refer to FIGS. 7-9. The accessory 100 could further include a second elastic member 32 for returning the operating member 3 to its original position. The second elastic member 32 is disposed between the operating member 3 and the main body 1. In this embodiment, the second elastic member 32 is a compressed spring (but not limited thereto), wherein an elastic force of the first elastic member 22 is larger than an elastic force of the second elastic member 32. As such, when the engaging hook 21 is not engaged with the transverse rod 201a of the seat body 201, the operating member 3 compresses the second elastic member 32. At this time, the elastic force of the first elastic member 22 exerted upon the engaging hook 21 is larger than the elastic force of the second elastic member 32 exerted upon the engaging hook 21 via the operating member 3, and the first elastic member 22 abuts against the engaging hook 21 to make the engaging hook 21 located at the releasing position. On the other hand, when the accessory 100 is engaged with the transverse rod 201a of the seat body 201, the transverse rod 201a compresses the first elastic member 22. At this time, the second elastic member 32 slides the operating member 3 to push the engaging hook 21, so as to rotate the engaging hook 21 to the locking position to be engaged with the transverse rod 201a for mounting the accessory 100 on the seat body 201. When the accessory 100 needs to be detached from the seat body 200, the operating member 3 can be operated to compress the second elastic member 32 to push the engaging hook 21, so as to rotate the engaging hook 21 to the releasing position to be disengaged from the transverse rod 201a for detaching the accessory 100 from the seat body 201. The designs of the engaging portion 2 and the operating member 3 are not limited to the aforesaid embodiment. In another embodiment, for example, the engaging portion 2 could be slidably disposed on the main body 1, and the operating member 3 could abut against the engaging portion 2. In such a manner, the operating member 3 can be operated to push the engaging portion 2, so that the engaging portion 2 can slide to the releasing position (at the same time, the engaging portion 2 compresses the first elastic member 22) to be detached from the main body 201 of the infant seat 200. When the operating member 3 is released, the second elastic member 32 can drive the operating member 3 to return to its original position, and the first elastic member 22 can drive the engaging portion 2 to slide to the locking position. In another embodiment, the engaging portion 2 could be pivotally disposed on the main body 1 and could be connected to the operating member 3, such that the operating member 3 can directly drive the engaging portion 2 to rotate to the releasing position and make the engaging portion 2 compress the first elastic member 22.

Please refer to FIG. 8 and FIG. 9. The operating member 3 has an insertion member 31 fixed thereon, and the engaging hook 21 has an insertion slot 211 formed thereon. The insertion member 31 can be engaged with or disengaged from the insertion slot 211 together with sliding of the operating member 3. When sliding of the operating member 3 pushes the engaging hook 21 to rotate to the locking position, the insertion member 31 is inserted into the insertion slot 211 for locking the engaging hook 21 at the locking position more firmly. When sliding of the operating member 3 pushes the engaging hook 21 to rotate to the releasing position, the insertion member 31 is disengaged from the insertion slot 211.

Figure 10:
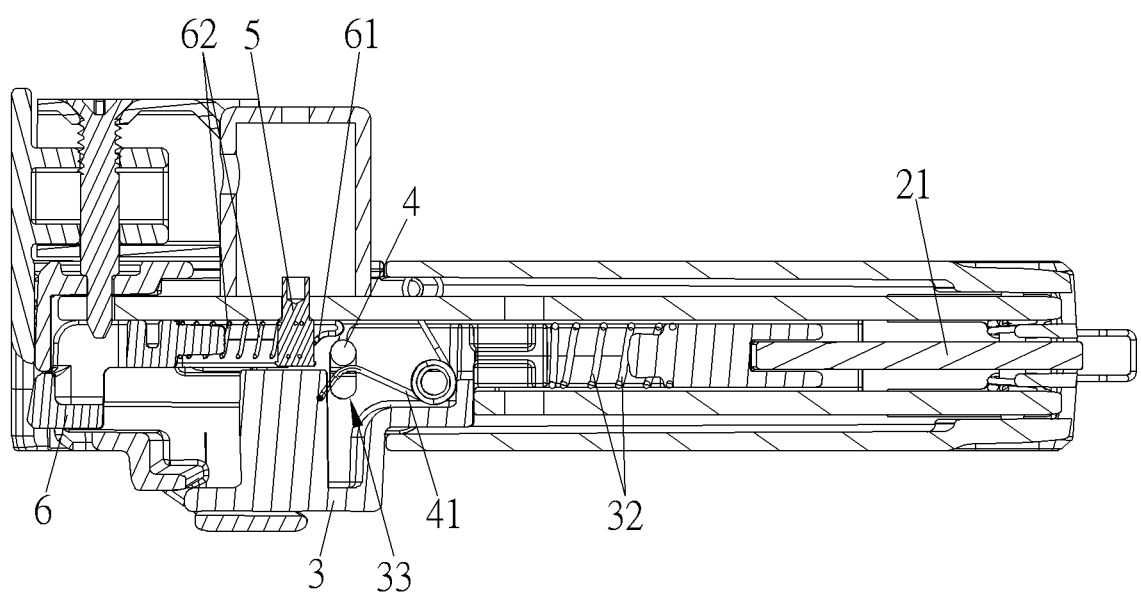
FIG. 10 is a cross-sectional diagram of the connection frame in FIG. 6 along a cross-sectional line C-C.

Please refer to FIG. 7 and FIG. 10. The accessory 100 of the present invention could further include an insertion pin 4 and a blocking member 5. The insertion pin 4 is slidably disposed on the operating member 3, and the blocking member 5 is fixed to the main body 1 in a sliding direction of the operating member 3 for blocking the insertion pin 4. The insertion pin 4 can be driven to be disengaged from the blocking member 5, so as to make the operating member 3 slidable. Specifically, a sliding slot 33 is formed on the operating member 3, and the insertion pin 4 is slidably disposed in the sliding slot 33. Moreover, the accessory 100 could further include a third elastic member 41 for returning the insertion pin 4 to its original position. The third elastic member 41 is disposed between the insertion pin 4 and the operating member 3. In this embodiment, the third elastic member 41 is a torsional spring, but not limited thereto. When the insertion pin 4 is driven to slide and then be disengaged from the blocking member 5, the insertion pin 4 compresses the third elastic member 41. When the insertion pin 4 is released, the third elastic member 41 can drive the insertion pin 4 to return to its original position.

Please refer to FIGS. 5-7 and FIG. 10. The accessory 100 could further include a secondary security lock 6 slidably disposed on the main body 1. The secondary security lock 6 can slide to push the insertion pin 4, so as to make the insertion pin 4 disengaged from the blocking member 5. Specifically, a ramped surface 61 is formed on an end of the secondary security lock 6. The secondary security lock 6 can drive the insertion pin 4 via the ramped surface 61, but the present invention is not limited thereto. Moreover, the accessory 100 of the present invention could further include a fourth elastic member 62 for returning the secondary security lock 6 to its original position. The fourth elastic member 62 is disposed between the secondary security lock 6 and the main body 1. In this embodiment, the fourth elastic member 62 is a compressed spring, but not limited thereto. When the secondary security lock 6 is operated to slide for pushing the insertion pin 4, the secondary security lock 6 compresses the fourth elastic member 62. When the secondary security lock 6 is released, the fourth elastic member 62 drives the secondary security lock 6 to slide in an opposite direction and then return to its original position, and the secondary security lock 6 no longer pushes the insertion pin 4.

Figure 4:
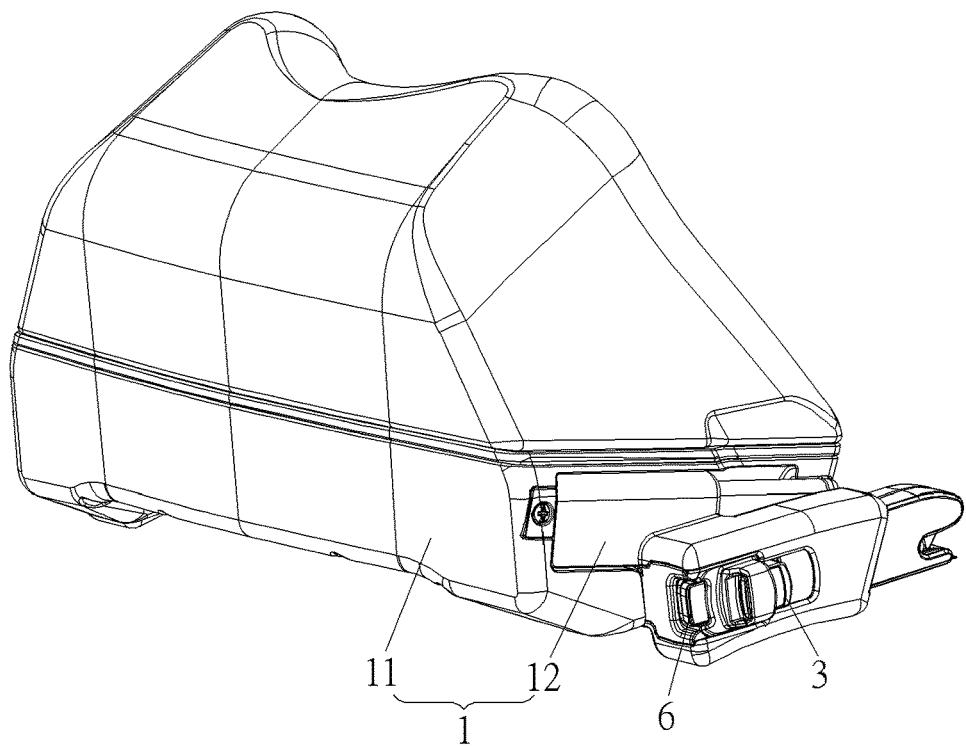
FIG. 4 is a diagram of an accessory of the present invention.
Figure 5:
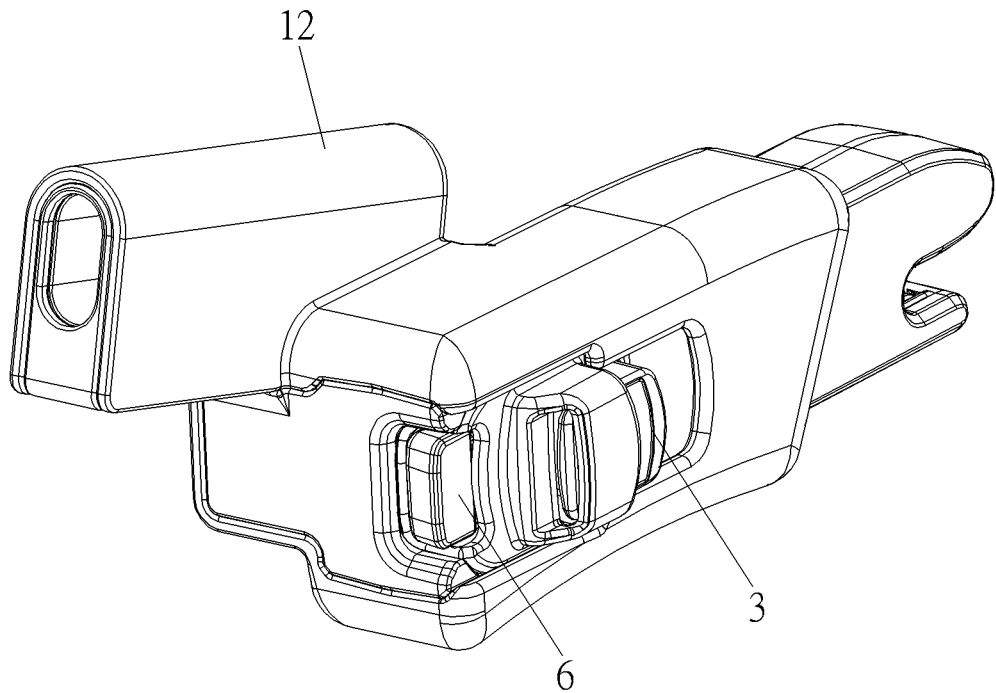
FIG. 5 is a diagram of a connection frame of the accessory in FIG. 4 after a buffer portion is detached.
Figure 6:
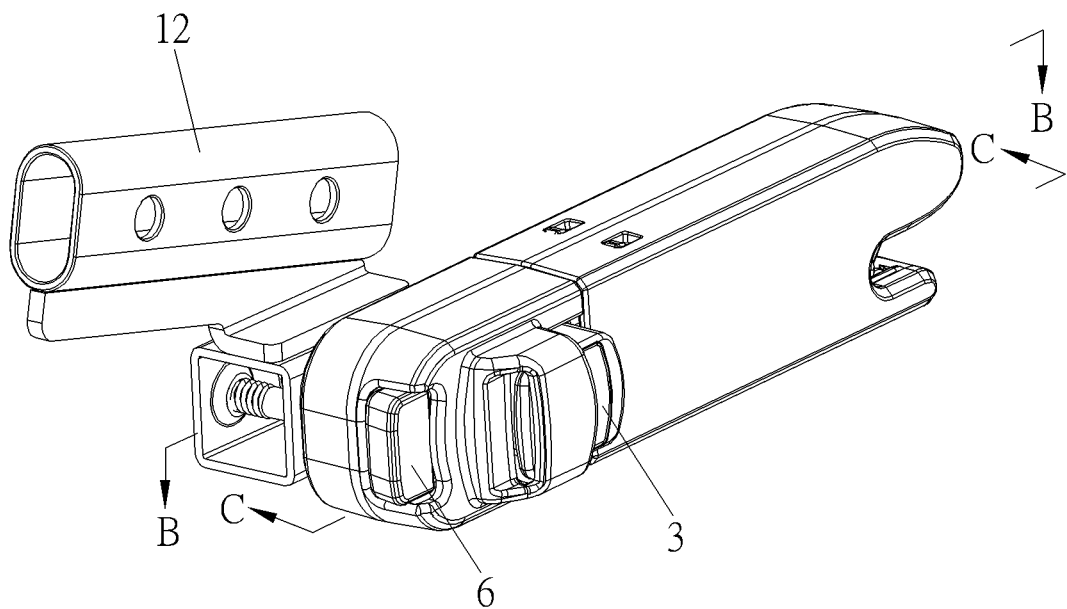
FIG. 6 is a diagram of the connection frame in FIG. 5 after a portion of the connection frame is omitted.

Please refer to FIG. 4. In this embodiment, the main body 1 is a front protection body, but not limited thereto. The main body 1 could include a buffer portion 11 and a connection frame 12. The buffer portion 11 is connected to the connection frame 12. The engaging portion 2, the operating member 3, the blocking member 5 and the secondary security lock 6 are disposed on the connection frame 12. Specifically, the engaging hook 21 is pivoted to the connection frame 12. The operating member 3 and the secondary security lock 6 are slidably disposed on the connection frame 12, and are partially exposed for operational convenience. The blocking member 5 is fixed to the connection frame 12. The buffer portion 11 can provide a buffer to an infant sitting on the seat body 201. Further, the connection frame 12 could be slidably disposed at a side of the buffer portion 11. By sliding the connection frame 12 on the buffer portion 11, a distance between the buffer portion 11 and the main body 201 can be adjusted accordingly when the engaging portion 2 is engaged with the seat body 201, so that the main body 1 can be suitable for infants of different sizes.

Please refer to FIGS. 1-10. The detailed description for the operations of the accessory 100 of the present invention is provided as follows.

When the accessory 100 is engaged with the transverse rod 201a of the seat body 201, the transverse rod 201a compresses the first elastic member 22. At this time, the second elastic member 32 drives the operating member 3 to slide for pushing the engaging hook 21, so that the engaging hook 21 can rotate to the locking position to be engaged with the transverse rod 201a. As such, the accessory 100 can be mounted on the seat body 201. When the accessory 100 needs to be detached from the seat body 201, the secondary security lock 6 can be operated to slide for pushing the insertion pin 4 via the ramped surface 61 of the secondary security lock 6, so that the insertion pin 4 can slide to be disengaged from the blocking member 5 for making the operating member 3 operable to slide. At this time, the secondary security lock 6 compresses the fourth elastic member 62. Subsequently, the operating member 3 can be operated to slide and compress the second elastic member 32 for pushing the engaging hook 21, so that the engaging hook 21 can rotate to the releasing position to be disengaged from the transverse rod 201a. As such, the accessory 100 can be detached from the seat body 201.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An accessory comprising:
   a main body comprising a buffer portion and a connection frame, the connection frame being slidably disposed at a side of the buffer portion;
   an engaging portion disposed on the connection frame, the engaging portion having a locking position for engaging with an infant seat and a releasing position for disengaging from the infant seat, the engaging portion comprising an engaging hook and a first elastic member disposed between the engaging hook and the main body for returning the engaging hook to its original position, the engaging hook being pivoted to the main body, and the first elastic member directly contacting and abutting against the engaging hook and the main body to drive the engaging hook to rotate to the releasing position; and
   an operating member slidably disposed on the connection frame and connected to the engaging portion, the operating member being operated to slide for switching the engaging portion between the locking position and the releasing position.

2. The accessory of claim 1, wherein the engaging hook is connected to the operating member, and the engaging hook rotates between the locking position and the releasing position via sliding of the operating member.

3. The accessory of claim 2, wherein the operating member has a connection pin fixed thereon, a guide slot is formed on the engaging hook, the connection pin is movably disposed in the guide slot, and the operating member rotates the engaging hook via the connection pin.

4. The accessory of claim 3, wherein the operating member further has an insertion member fixed thereon, an insertion slot is formed on the engaging hook, and the insertion member is inserted into or disengaged from the insertion slot via sliding of the operating member.

5. The accessory of claim 1, wherein the accessory further comprises a second elastic member for returning the operating member to its original position, and the second elastic member is disposed between the operating member and the main body.

6. The accessory of claim 5, wherein an elastic force of the first elastic member exerted upon the engaging hook is larger than an elastic force of the second elastic member exerted upon the engaging hook via the operating member.

7. The accessory of claim 1, wherein the accessory further comprises an insertion pin and a blocking member, the insertion pin is slidably disposed on the operating member, the blocking member is fixed to the main body in a sliding direction of the operating member for blocking the insertion pin, and the operating member is slidable when the insertion pin is disengaged from the blocking member.

8. The accessory of claim 7, wherein a sliding slot is formed on the operating member, and the insertion pin is slidably disposed in the sliding slot.

9. The accessory of claim 7, wherein the accessory further comprises a third elastic member for returning the insertion pin to its original position, and the third elastic member is disposed between the insertion pin and the operating member.

10. The accessory of claim 7, wherein the accessory further comprises a secondary security lock slidably disposed on the main body, and the secondary security lock slides for pushing the insertion pin to be disengaged from the blocking member.

11. The accessory of claim 10, wherein a ramped surface is formed on an end of the secondary security lock, and the secondary security lock drives the insertion pin to slide via the ramped surface.

12. The accessory of claim 10, wherein the accessory further comprises a fourth elastic member for returning the secondary security lock to its original position, and the fourth elastic member is disposed between the secondary security lock and the main body.

13. An infant seat comprising:
a seat body; and
an accessory comprising:
a main body comprising a buffer portion and a connection frame, the connection frame being slidably disposed at a side of the buffer portion;
an engaging portion disposed on the connection frame, the engaging portion having a locking position for engaging with the seat body and a releasing position for disengaging from the seat body, the engaging portion comprising an engaging hook and a first elastic member disposed between the engaging hook and the main body for returning the engaging hook to its original position, the engaging hook being pivoted to the main body, and the first elastic member directly contacting and abutting against the engaging hook and the main body to drive the engaging hook to rotate to the releasing position; and
an operating member slidably disposed on the connection frame and connected to the engaging portion, the operating member being operated to slide for switching the engaging portion between the locking position and the releasing position.

14. The infant seat of claim 13, wherein the seat body has a transverse rod for engaging with the engaging portion.

15. The infant seat of claim 13, wherein the engaging hook is connected to the operating member, and the engaging hook rotates between the locking position and the releasing position via sliding of the operating member.

16. The infant seat of claim 15, wherein the operating member has a connection pin fixed thereon, a guide slot is formed on the engaging hook, the connection pin is movably disposed in the guide slot, and the operating member rotates the engaging hook via the connection pin.

* * * * *